Sept. 4, 1951 J. C. HEINTZ 2,566,797
REPAIR MOLD
Filed Nov. 19, 1948 4 Sheets-Sheet 1

INVENTOR.
JAMES C. HEINTZ
BY Gordon C. Mark
Attorney

Sept. 4, 1951 J. C. HEINTZ 2,566,797
REPAIR MOLD

Filed Nov. 19, 1948 4 Sheets-Sheet 2

INVENTOR.
JAMES C. HEINTZ
BY
Attorney

Sept. 4, 1951  J. C. HEINTZ  2,566,797
REPAIR MOLD
Filed Nov. 19, 1948  4 Sheets-Sheet 3

INVENTOR.
JAMES C. HEINTZ
BY
*Gordon P. Mack*
*Attorney*

Sept. 4, 1951  J. C. HEINTZ  2,566,797
REPAIR MOLD

Filed Nov. 19, 1948  4 Sheets-Sheet 4

INVENTOR.
JAMES C. HEINTZ
BY
Attorney

Patented Sept. 4, 1951

2,566,797

UNITED STATES PATENT OFFICE 2,566,797

REPAIR MOLD

James C. Heintz, Lakewood, Ohio

Application November 19, 1948, Serial No. 60,977

6 Claims. (Cl. 18—18)

1

The invention relates to an improved mold for repairing tires. The size of the cavity for holding the tire is adjustable, and with a few interchangeable parts the mold will accommodate tires of a great variety of sizes. The mold is more particularly designed for the repair of large truck, bus and implement tires which are made in a variety of sizes all of which tend to grow in size in actual use.

The interchangeable parts of the mold of this invention are (1) the bead plate which must be of the exact size required to fit the tire being repaired, (2) matrices which approximate the shape of the tread of the tire when inflated, and (3) sidewall plates, each of which may be used with all tires of approximately the same size. The tire may be repaired while mounted on a rim and in that event the bead plate will not be used. A cavity of the desired size to fit each individual tire is obtained by applying pressure to the bead plate (or rim) and one of the sidewall plates by bolts, as will be explained in what follows.

The heating elements of the mold are embodied in a stationary base plate and vertical side plate which are the same for all sizes of tires. One of the sidewall plates and the bead plate, if used, are mounted on the bolts, and these are in threaded engagement with nuts slidably mounted on horizontal and vertical members which are either pivotally or rigidly joined at one end. The opposite ends of these members are united to the stationary base plate and vertical side plate. The union with either the base plate or side plate is preferably made by means of a permanent swivel joint. The union with the side plate is preferably one that is easily broken. However, the nature of these unions may vary in different embodiments of the invention, at least one being easily broken for the insertion of a tire into the mold and its removal therefrom.

The invention will be further described in connection with the accompanying drawings in which—

2

Figure 7:
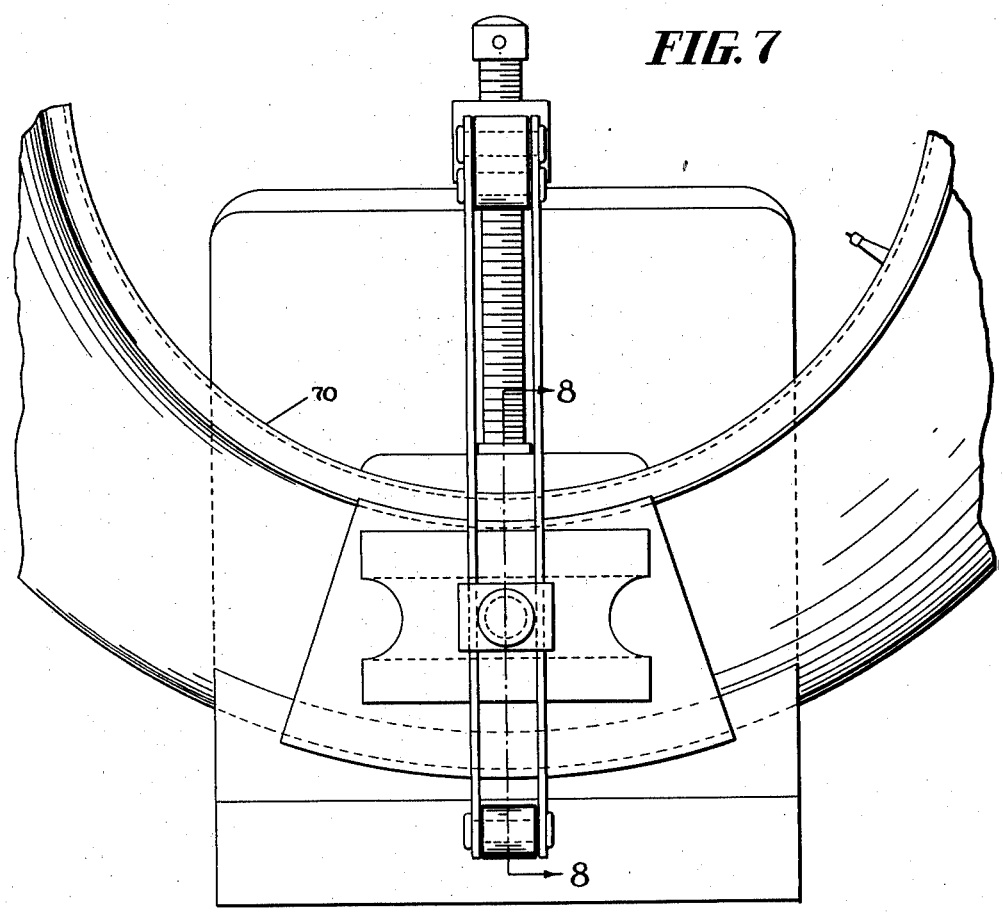

Fig. 7 is an end view of the mold holding a tire mounted on a ring; and

Figure 8:
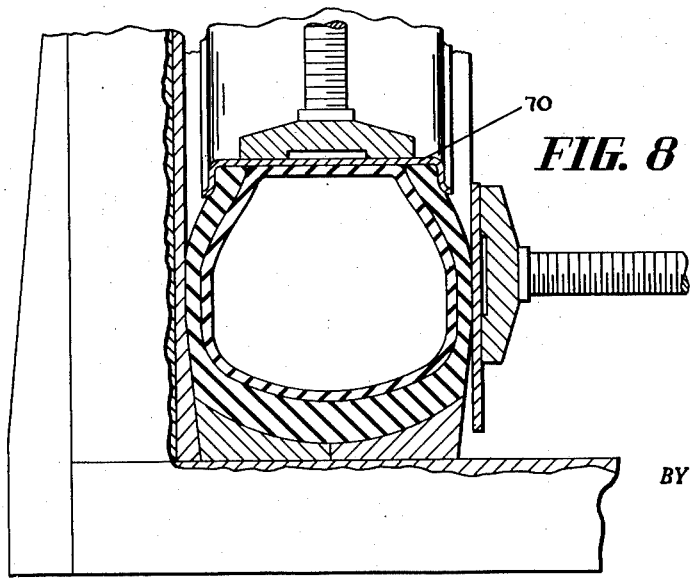

Fig. 8 is a sectional view on the line 8—8 of Fig. 7.

The mold is formed with a base plate 1 and side plate 2. Fastened to each are three heating elements 5. The wires 6 leading to these heating elements are connected with switch means which preferably permit the passage of the current to certain of the elements without passage through other elements. Thus, for the small tire illustrated in Fig. 1, only the four elements nearest the lower left-hand corner of the mold need be used. For repairing a larger tire all elements will be required. If the injury in a large tire is located near the bead of the tire, it may be necessary to heat only the upper two of the elements at the side, and the lower heating elements may not then be needed. Thus, the heating elements are preferably separately connected to switch means to regulate the heating of the base and side plates. The heating elements are enclosed so that the entire base 8 and entire side 9 of the mold may be referred to herein as the base and side of the mold.

The sidewall plate 10 is placed flush against the side plate 2 and is heated from the side plate. It preferably widens out at 11 near its bottom to conform to the shape of a tire to be repaired. The matrices 12 and 13 are placed on the base plate 1 and are heated from this base plate. They preferably have a smooth molding surface free from any tread design. Thus they are adapted to cure all tires regardless of the tread design, and where the design is required it may be cut into the repair after vulcanization. The curvature of the molding surface approximates rather closely the shape of the tread of the tire to be repaired and thus matrices of different contour are required for the repair of tires of different sizes.

The head plate 20 is formed at the inner end with a large wedge 21, the outer wall of which fits flush against the sidewall plate 10. Thus heat is transmitted from the sidewall through this wedge to the tire bead. At the other end of the bead plate is a knob 22 which is designed merely to fit over the tire and hold it.

Figures 1, 1A, 1B:
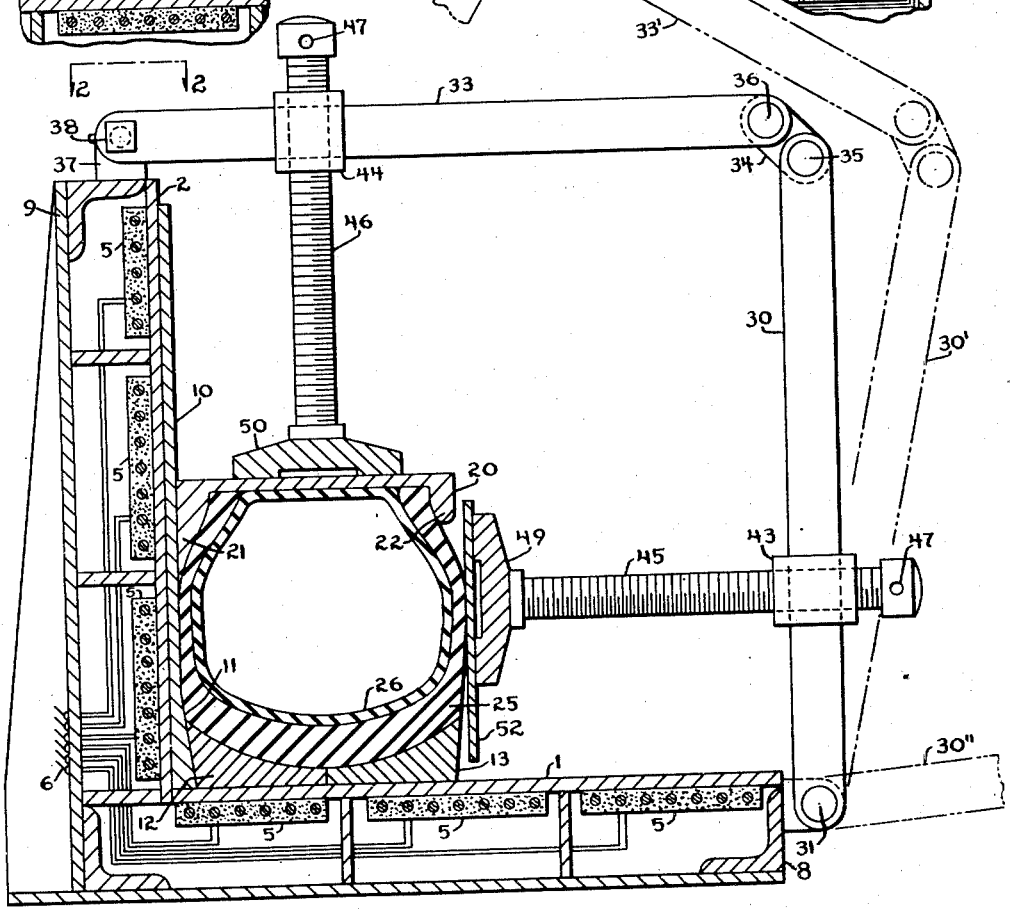
Fig. 1 is a vertical section through the mold and a tire being repaired, on the line 1—1 of Fig. 3.
Figs. 1a and 1b are details showing modifications of the structure shown in Fig. 1.

This mold may be used in the repair of most tire injuries. If the injury is near a bead, the side of the tire will be placed toward the heated sidewall plate. There is no need for heating the other side of the tire when such a repair is being made. Similarly, if the injury is in the sidewall, that side of the tire will be placed against the sidewall plate. Whenever required, the sidewall plate can be heated as shown in Fig. 1b and explained below. If the injury is in the tread, the tire will be placed so that the repair will be heated to the best advantage. Ordinarily, any tread repair can be vulcanized in this type of mold. The repair is made by cutting away the old rubber in any usual way and as much of the carcass as is required, with subsequent replacement of fabric and use of uncured rubber in forming the repair.

In heating the repair to cure the rubber, the proper sidewall 10 and matrices 12 and 13 are first put in place. Then the tire 25 is placed in the mold. The air or steam bag 26 is placed within the tire. A sectional bag is all that is needed. The bead plate 20 will then be placed over the tire beads.

Figure 2:
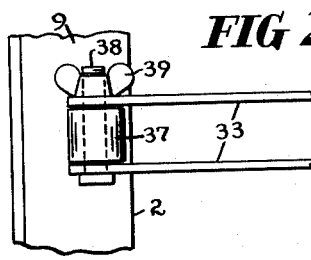
Fig. 2 is a detail on the line 2—2 of Fig. 1.

It is then necessary to apply pressure to the bead plate and to the exposed wall of the tire to prevent enlargement of the tire when the bag is inflated. The pressure is applied through bolts which are adapted to be arranged substantially perpendicularly to the base plate and side plate. These bolts are threaded through nuts slidably mounted on suitably pivoted bars. The side bar 30 is pivoted to the base at 31. The top bar 33 is joined to the side bar 30 by the short link 34 at the pivot points 35 and 36. The other end of the top bar 33 is fastened to the stud 37 by the bolt and wing nut 38 and 39 (Fig. 2). The side and top bars 30 and 33 may be of double construction as illustrated in Fig. 2. The threaded nut 43 is adapted to slide on the side bar 30 and the threaded nut 44 is adapted to slide on the top bar 33. The nuts 43 and 44 are apertured to receive the bars and between these apertures and perpendicular thereto are the threaded openings which receive the bolts 45 and 46. The head of each bolt is provided with an opening 47 to receive a bar which may be used to facilitate turning the screw. At the base of the bolts are the pressure plates 49 and 50 which are of relatively large areas and thus spread the pressure applied to the bead plate 20 and sidewall plate 52.

The pressure plates 49 and 50 are not connected to the sidewall plate 52 or the bead plate 20. Thus, a sidewall plate of any size and shape and a bead plate of any required width and diameter, are used as required.

As illustrated in Fig. 1a the sidewall plate 52 may be insulated at 60 to prevent loss of heat from the heating bag 26 through the tire to the sidewall plate 52. Alternatively, the sidewall plate 52 may be equipped with heating means 65 connected by the wires 66 to the main control panel so that the sidewall plate 52 may be heated as desired to heat the outer sidewall whenever this is required, and to prevent loss of heat from the heating bag 26 with accompanying drop in temperature.

The bars 30 and 33 are pivoted together, and pivoted to the base plate, so that when a tire is being mounted in the mold or being removed from the mold, these bars may be laid out flat—to the right of the mold. Fig. 1 shows the bars at 30' and 33' in the process of being laid out flat or being assembled, and at 30" the bars are shown laid out flat. This gives ready access to the mold and the parts may readily be interchanged.

After placing the tire on the matrices and putting the bead plate in place the bars 30 and 33 are brought up and the bar 33 is fastened to the stud 37 by the bolt and nut 38 and 39. The nuts 43 and 44 are brought to the proper position to apply pressure at the desired places on the tire. The bolt 46 is preferably first lowered until the pressure plate 50 contacts the bead plate 20. The bolt 45 may then be turned in and the sidewall plate 52 will be pressed against the sidewall of the tire by the pressure plate 49. Once the two bolts have been brought to operate on the tire, the pressure is adjusted so as to not distort the tire. This is a simple matter for the expert. It is merely necessary to adjust the bolt 46 to tighten the bead plate against both beads of the tire snugly and to apply slight pressure to the exposed sidewall. The bag within the tire is then inflated to place the rubber of the tire under compression so that the cure will be effected under pressure. Then with the proper heating elements heated to the required temperature the cure is effected.

After curing, the mold is readily disassembled. The wing bolt 39 is loosened and the bolt 38 removed, and then the bars and pressure bolts are swung over to the right away from the tire. The sidewall plate is removed, and the bead plate is then removed and the tire taken from the mold.

Figure 4:
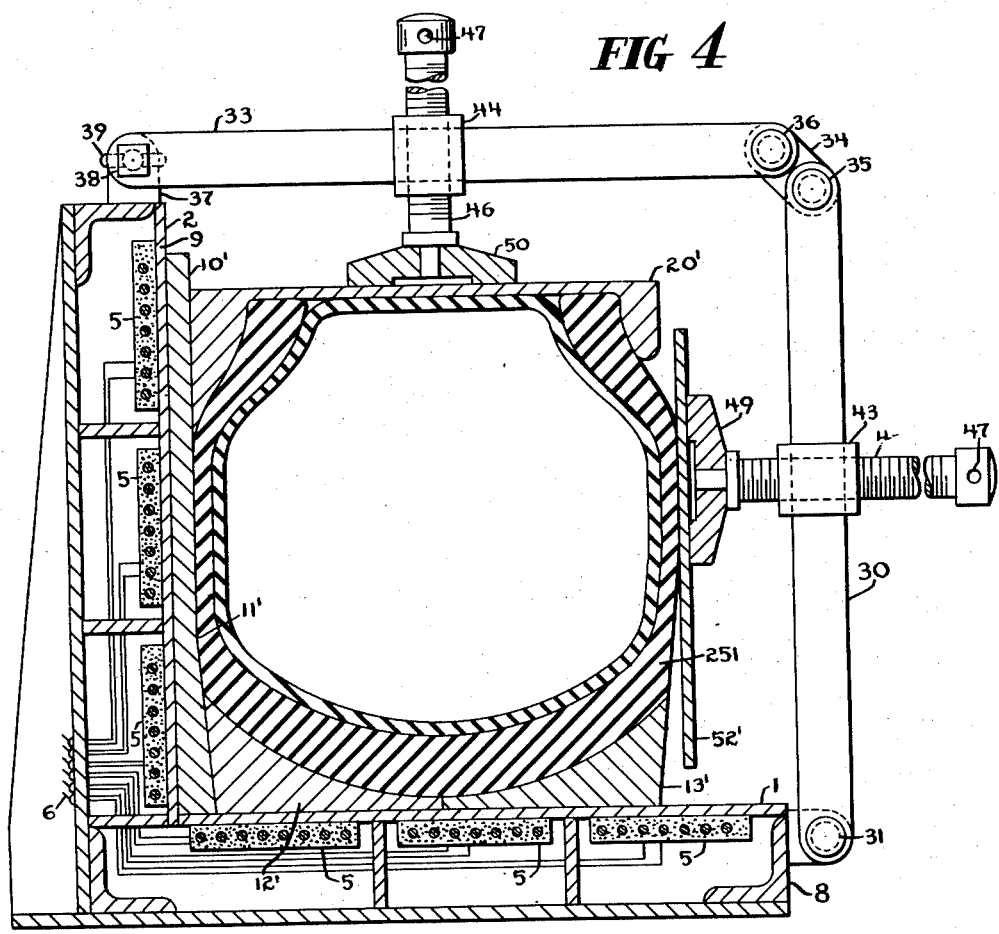
Fig. 4 is a view similar to the view of Fig. 1 but showing the use of the mold with a tire of different size.

Fig. 4 shows that for a larger tire 25', a sidewall plate or wedge 10' which has the break at a different place 11' may be used. The matrices 12' and 13' are of a larger size and a larger bead plate 20' is used. The bolts 45 and 46 are turned much further back into the nuts 43 and 44. A larger side plate 52' is preferably used. Thus with only a few changes, the same mold may be used for the repair of tires of different sizes.

Figure 3:
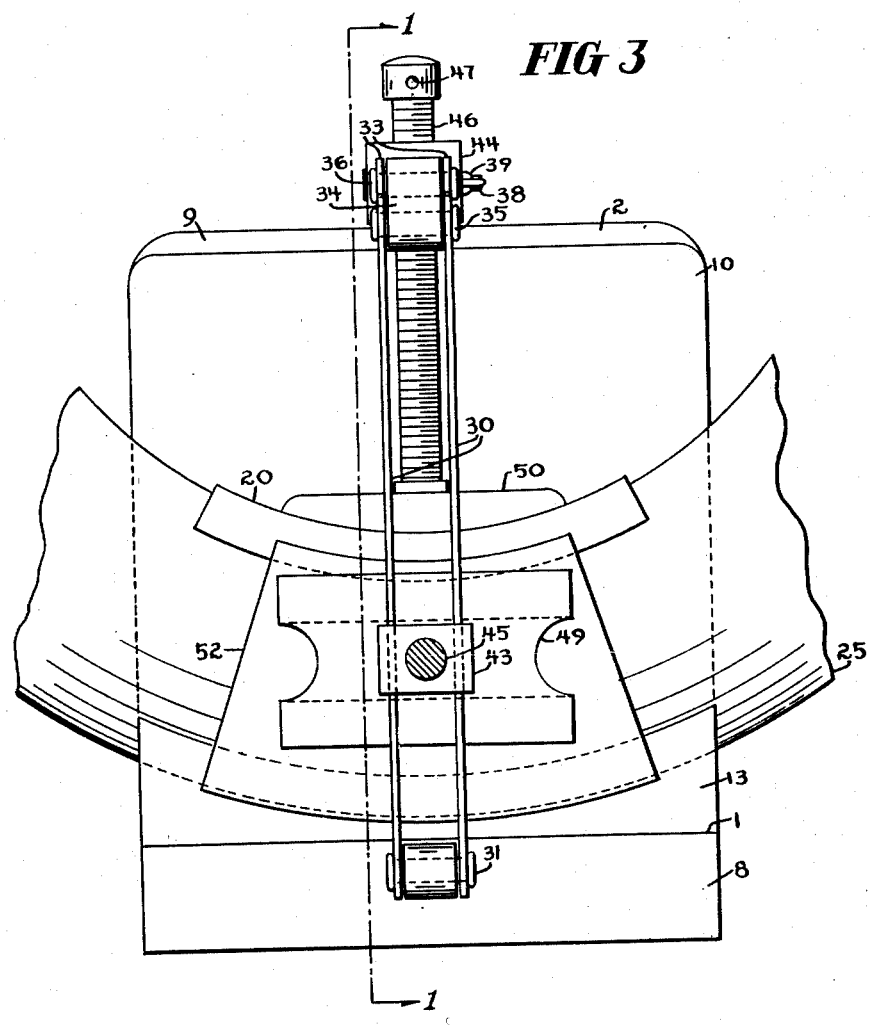
Fig. 3 is an end view of the mold and a portion of the tire shown in Fig. 1.

In Figs. 7 and 8, instead of using a bead plate to embrace the tire beads, the tire is mounted on the rim 70. In other respects the mold is the same as shown in Figs. 1 and 3, and is operated in the same manner.

Figure 5:
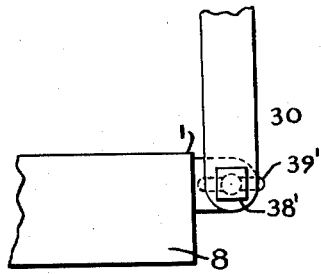
Figs. 5 and 6 are details of alternative structures.
Figure 6:
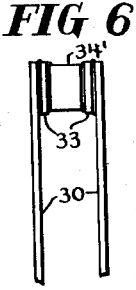

Modifications may be made in the mold without departing from the invention. For instance, the pivot 31 might be replaced by a bolt 38' and wing nut 39', as illustrated in Fig. 5. Then the two bolts 45 and 46 and supporting means can be lifted from the balance of the mold. To facilitate this the link 34, etc. may to advantage be replaced by a welded rigid joint in which the two bars 33 are placed inside the bars 30 at this point, and welded thereto with a spacer 34' between them, as illustrated in Fig. 6.

The invention is defined in the claims which follow.

What I claim is:

1. A mold for repairing a tire, having a base plate and a side plate with means for heating each, vertical means on the base plate remote from the side plate, a nut slidably mounted thereon and a bolt threaded through the nut, horizontal means above the base plate, a nut slidably mounted thereon and a bolt threaded through the nut, and means adapted to be pressed against one side of the tire by the first bolt and a bead plate adapted to be pressed over the beads of the tire by the second bolt.

2. A mold for repairing a tire, having a base plate and a side plate with means for heating each, vertical means on the base plate remote from the side plate, a nut slidably mounted thereon and a bolt threaded through the nut, horizontal means above the base plate, a nut slidably mounted thereon and a bolt threaded through the nut, and means adapted to be pressed against one side of the tire by the first bolt, and adapted to be pressed against the inner surface of the tire by the second bolt.

3. A mold for repairing a tire, having a base and side plate, each adapted to be heated, means remote from the side plate in pivotal engagement with the edge of the base one end of which is adapted to be arranged vertically, the other end of said means being in connection with one end of a second means which is adapted to be arranged horizontally, its opposite end being adapted to be removably fastened to the top of the side plate, on each of said first and second means a nut with a threaded opening arranged perpendicularly to the means, each nut being adapted to slide on its means and in each threaded opening a bolt, the bolt which is slidably mounted on said first mentioned means being adapted to apply pressure toward the sidewall of a tire and the bolt which is slidably mounted on the second mentioned means being adapted to apply pressure toward the beads of the tire.

4. A mold for the repair of a tire, which includes a base plate and a side plate, heating means in the base plate and the side plate, matrices on the base plate and a sidewall plate standing on the base plate adjacent the side plate, a pivot at about the middle of the edge of the base plate opposite the side plate, which pivot is engaged with one end of two parallel slide bars of the same length and about the length of the height of the side plate, two other slide bars about the length of the base arranged in parallel relationship, one end of the last mentioned set of slide bars being pivotally engaged with the other end of the first mentioned slide bars, the opposite end of the second mentioned slide bars being engaged with means at the top of the side plate, a nut slidably mounted on each set of slide bars with a threaded opening perpendicular to the bars, and in each nut a bolt, one of said bolts being adapted to apply pressure toward the sidewall of a tire and capable of pressing a sidewall plate to the tire above the matrices, and the other bolt being adapted to apply pressure toward the beads of a tire.

5. A mold for repairing a tire, having a base and side plate, means for heating both, two slide means pivotally connected at one end with their other ends fastened to the base and side plate of the mold respectively, one of said fastenings being easily unfastened, two bolts adapted for applying pressure toward the beads and sidewall of the tire, respectively, each bolt being slidably mounted on one of said slide means.

6. A mold for repairing a tire, having a base and side plate, means for heating each, two slide means rigidly connected at right angles at one end with their opposite ends fastened to the base and side plate of the mold respectively, one of said fastenings being easily unfastened, and two bolts adapted for applying pressure toward the beads and sidewall of the tire, respectively, said bolts being slidably mounted on said slide means.

JAMES C. HEINTZ.

REFERENCES CITED

The following references are of record in the file of this patent:

UNITED STATES PATENTS

| Number | Name | Date |
| --- | --- | --- |
| 1,793,473 | Freed | Feb. 24, 1931 |
| 1,875,727 | Heintz | Sept. 6, 1932 |
| 2,032,222 | Norris | Feb. 25, 1936 |
| 2,347,952 | James | May 2, 1944 |
| 2,420,766 | Baker | May 20, 1947 |
| 2,438,677 | Ostler | Mar. 30, 1948 |
| 2,464,232 | Hudson | Mar. 15, 1949 |